United States Patent [19]

Moczygemba et al.

[11] 4,035,570

[45] July 12, 1977

[54] METHOD AND CATALYST FOR THE PRODUCTION OF HIGH TRANS-POLYALKADIENE

[75] Inventors: George A. Moczygemba; Floyd E. Naylor, both of Bartlesville, Okla.

[73] Assignee: Phillips Petroleum Company, Bartlesville, Okla.

[21] Appl. No.: 543,497

[22] Filed: Jan. 23, 1975

[51] Int. Cl.² .................... C08F 4/66; C08F 36/08
[52] U.S. Cl. .................... 526/142; 252/429 B; 526/134; 526/144; 526/335
[58] Field of Search ............... 252/429 B; 260/94.3; 450/666; 526/142, 144, 134

[56] References Cited

U.S. PATENT DOCUMENTS

| | | | |
|---|---|---|---|
| 2,977,349 | 3/1961 | Brockway et al. | 260/94.3 |
| 3,050,513 | 8/1962 | Zelinski et al. | 260/94.3 |
| 3,066,129 | 11/1962 | Farrar | 260/94.3 |
| 3,242,156 | 3/1966 | Marconi | 260/94.3 |
| 3,382,225 | 5/1968 | Naylor | 260/94.3 |
| 3,403,141 | 9/1968 | Zelinski et al. | 260/94.3 |
| 3,449,312 | 6/1969 | Minchak | 260/94.3 |

*Primary Examiner*—Edward J. Smith

[57] ABSTRACT

Polyalkadienes with high percentage of trans configurations are produced by employing a catalyst system obtained by admixing (A) at least one hydride having the general formula $MZR_aH_{(4-a)}$ wherein M is lithium, sodium, potassium, rubidium or cesium, Z is aluminum or boron, R is hydrogen or a monovalent, saturated, cyclic or acyclic hydrocarbon radical containing up to 12 carbon atoms, and $a$ is an integer between 0 and 2, (B) at least one titanium tetrahalide compound having the general formula $TiX_4$ wherein X is chloride or bromide, (C) an iodine composition having the general formula R'I wherein R' is a monovalent, saturated, cyclic or acyclic hydrocarbon radical containing up to 12 carbon atoms, and (D) an ether having the general formula R"—O—R‴ wherein R" and R‴ can be the same or different monovalent, saturated, cyclic or acyclic hydrocarbon radicals containing 2 to 12 carbon atoms with a total of not more than about 16 carbon atoms per ether molecule.

11 Claims, No Drawings

METHOD AND CATALYST FOR THE PRODUCTION OF HIGH TRANS-POLYALKADIENE

This invention relates to the polymerization of acyclic, conjugated alkadienes. More specifically this invention relates to the polymerization of isoprene.

BACKGROUND OF THE INVENTION

Conjugated alkadienes can be polymerized in various ways. For some applications the polyalkadienes should have a high content of cis-configurations in the polymer. The high cis-polybutadiene, for example, is very resilient. For other purposes a polymer with high content of transconfigurations is preferred. High trans-polyisoprene, for instance, is a resinous, nonresilient, elastic, thermoplastic, tough, crystalline, solid polymer. These high trans-polyalkadienes can be used for electrical insulation of wires and cables, for the production of battery casings and golf ball covers.

THE INVENTION

It is one object of this invention to provide a new process for making polyalkadienes.

Another object of this invention is to provide a process for the production of high trans-polyalkadienes.

A further object of this invention is to provide a process for the production of polyisoprene.

Still another object of this invention is to provide a process for the production of high trans-polyisoprene.

Furthermore it is one object of this invention to provide a process for the production of a polyisoprene having a relatively high crystallization rate in order to facilitate molding operations.

Still a further object of this invention is to provide a new catalyst system which can be used for the production of high trans-polyalkadienes.

Another object of this invention is to provide a new catalyst system for the production of polyisoprene with a high content of trans-configurations.

These and other objects, advantages, features and embodiments of this invention will become apparent to a person with skill in the art from the following detailed description of the invention as well as the appended claims.

In accordance with this invention there is now provided a process for the production of polyalkadienes by polymerization of alkadienes under polymerization conditions in contact with a catalyst system made by admixing at least one metal hydride having the general formula $MZR_aH_{(4-a)}$ wherein M is lithium, sodium, potassium, rubidium or cesium, Z is aluminum or boron, R is hydrogen or a monovalent, saturated, cyclic or acyclic hydrocarbon radical containing up to 12 carbon atoms, and $a$ is an integer between 0 and 2; a titanium tetrahalide compound having the general formula $TiX_4$ wherein X is chloride or bromide; an iodine composition having the general formula R'I wherein R' is a monovalent, saturated, cyclic or acyclic hydrocarbon radical containing 2 to 12 carbon atoms; and an ether having the general formula R''—O—R''' wherein R'' and R''' can be the same or different monovalent, saturated, cyclic or acyclic hydrocarbon radicals containing 2 to 12 carbon atoms with a total of not more than about 16 carbon atoms per molecule.

In a presently preferred embodiment of this invention the metal hydride is lithium aluminum hydride. Other examples of such compounds are sodium borohydride, lithium borohydride, as well as alkyl hydrides such as sodium aluminum diethyl hydride and the like.

The metal hydride is preferably used as a solution. The preferred solvent is an alkyl ether or mixtures of alkyl ethers. Examples for such ethers are n-butyl ether, diethyl ether and the like.

In accordance with this invention the catalyst system comprises a directing ether. This directing ether can be either present as the solvent ether for the reducing agent or it can be added separately. The directing ether can also be present in addition to the solvent ether for the reducing agent. Suitable ethers are, for example, diethyl ether, diamyl ether, methyl dodecyl ether, ethyl cyclohexyl ether, and the like and mixtures thereof. The preferred directing ether is diethyl ether.

In accordance with a further embodiment of this invention dimethyl ether or methyl ethyl ether are added to the catalyst system in addition to the other directing ether defined above. The preferred range for the dimethyl- and/or the methyl ethyl ether is up to about 20 mhm. It is preferred to use dimethyl- and/or methyl ethyl ether together with diethyl ether as the directing ether.

The ratios of the ingredients which are mixed to produce the catalyst, as well as the concentration of the catalyst with respect to the monomers, can vary in wide ranges. The broad ranges for the ratios and concentrations, as well as the presently preferred ranges therefor, are shown in the following table. In this table "metal hydride" is used for the alkali metal-Group IIIA element-hydride, "titanium tetrahalide" is used for titanium tetrabromide or titanium tetrachloride, "monomer" is used for an alkadiene having 4 to 12 carbon atoms and 2 conjugated double bonds. The abbreviation "phm" refers to parts by weight per hundred parts by weight of monomer, "mhm" refers to gram millimoles per hundred grams of monomer.

TABLE I

| Ingredients | Broad Range | Preferred Range |
| --- | --- | --- |
| Metal hydride, mhm | 0.5–20 | 1–8 |
| Metal hydride/titanium tetrahalide (mole ratio) | 1/1–6/1 | 1.5/1–5/1 |
| Metal hydride/alkyl iodide, R'I (mole ratio) | 1/0.5–1/50 | 1/1–1/15 |
| Ether, R''—O—R''', phm | 1–30 | 2–16 |

The polymerization reaction is usually carried out in the presence of a diluent. A diluent that will not detrimentally affect the polymerization process, such as paraffins and cycloparaffins, can be used. Examples for such diluents are n-hexane, n-heptane, 2,2,4-trimethylpentane, cyclohexane and the like and mixtures thereof.

The polymerization conditions can vary in large ranges. The polymerization temperature is, broadly, between 30° and 100° C, but preferably between 40° and 70° C. The polymerization reaction can be carried out under autogenous pressure or at any suitable pressure sufficient to maintain the reaction mixture substantially in the liquid phase. The pressure will thus depend upon the particular diluent being employed and the temperature at which the polymerization is carried out. However, higher pressures can be employed if desired, these pressures being obtained by, e.g., pressurization of the reactor with an inert gas. The polymerization time will depend upon the temperature, the catalyst level and the like. The polymerization time, however, will generally range from a few seconds up to 48 hours, preferably from 4 to 24 hours.

Various materials are known to be detrimental to the catalyst of this type employed in preparing the polymers of alkadienes. These materials include carbon dioxide, oxygen and water. It is therefore usually desirable that the reactants and catalysts be freed of these materials as well as other materials which may tend to inactivate the catalyst. Furthermore, it is desirable to remove air and moisture from the reaction vessel in which the polymerization is to be conducted.

Upon completion of the polymerization the polymerization mixture is treated to inactivate the catalyst and to recover the polymer. A suitable method for accomplishing this result involves steam stripping the diluent from the polymer. In another suitable method a catalyst-activating material, such as an alcohol, is added to the mixture so as to inactivate the catalyst and to cause precipitation of the polymer. The polymer is then separated from the alcohol and diluent by any suitable means such as decantation or filtration. It has been found advantageous to add an antioxidant such as 2,6-di-tert-butyl-4-methylphenol to the polymer solution prior to recovery of the polymer.

The invention will be more fully understood from the following examples.

EXAMPLE I

780 Parts by weight of cyclohexane were charged into each of four beverage bottles. Thereafter 1.3 mhm lithium aluminum hydride was added as a 0.35 molar solution in diethyl ether. Then variable quantities of diethyl ether were added to each of the four bottles. Finally 0.65 mhm of titanium tetrachloride as a 0.48 molar solution in cyclohexane was added, followed by variable quantities of methyl iodide and then by 100 parts by weight of butadiene. The variable quantities for each of bottles are shown in the following table.

The bottles were tumbled in a constant temperature bath of 70° C for 17 hours. Following the polymerization 1 phm of 2,6-di-tert-butyl-4-methyphenol was added in a 50/50 volume ratio toluene/isopropyl alcohol solution. The polymer solutions were filtered and the polymers were coagulated by adding the filtrates to isopropyl alcohol. The polymers were then collected by filtration and dried at reduced pressure. A thermoplastic polymer was recovered. The results of this example are shown in the following Table I. The quantity of diethyl ether refers to the total content of diethyl ether, i.e., the quantity used as the solvent for the reducing agent as well as the additional quantity added.

TABLE I

| Run No. | Et$_2$O phm[1] | MeI mhm[2] | Con-version wt.%[3] | Trans[4] wt.% | Vi-nyl[4] wt.% | Inher-ent[5] Viscos-ity | Gel[6] wt.% |
|---|---|---|---|---|---|---|---|
| 1 | 2.5 | 0 | 14 | Insoluble | | 1.88 | 10 |
| 2 | 2.5 | 2 | 78 | —[7] | — | — | — |
| 3 | 2.5 | 4 | 86 | — | — | — | — |
| 4 | 2.5 | 8 | 88 | 65.4 | 3.2 | 5.27 | 0 |
| 5 | 10 | 0 | 6 | 65.7 | 14.4 | 1.43 | 0 |
| 6 | 10 | 2 | 21 | — | — | — | — |
| 7 | 10 | 4 | 70 | 76.8 | 3.7 | 4.48 | 0 |
| 8 | 10 | 8 | 68 | 78.5 | 3.0 | 4.39 | 0 |
| 9 | 20 | 0 | 5 | 64.4 | 13.1 | 1.03 | 0 |
| 10 | 20 | 2 | 30 | 74.1 | 5.0 | 2.66 | 0 |

TABLE I-continued

| Run No. | Et$_2$O phm[1] | MeI mhm[2] | Con-version wt.%[3] | Trans[4] wt.% | Vi-nyl[4] wt.% | Inher-ent[5] Viscos-ity | Gel[6] wt.% |
|---|---|---|---|---|---|---|---|
| 11 | 20 | 8 | 55 | 80.4 | 2.8 | 3.63 | 0 |

[1]Parts by weight per hundred parts by weight of monomer
[2]Gram millimoles per hundred grams of monomer.
[3]Conversion refers to conversion of monomer to polymer as determined by weight of polymer recovered.
[4]Microstructure determinations were by infrared absorption spectroscopy.
[5]Inherent viscosity determined in accordance with U.S. Pat. No. 3,278,508, col. 20, note a with the modification that tetrahydrofuran was employed in place of toluene and with the further modification that the solution was not filtered through a sulfur tube but rather a sample of the solution through a fritted glass filter stick of grade C porosity and pressured directly into the viscosimeter.
[6]The gel content of the polymer was determined in weight percent in accordance with U.S. Pat. No. 3,278,508, col. 20, note b with the modification that tetrahydrofuran was employed in place of toluene.
[7]A dash denotes determination was not made.

The above-shown results of Example I illustrate that the trans content of the polybutadiene made is increased with an increase in the level of diethyl ether employed and with an increase in the quantity of methyl iodide used.

EXAMPLE II

The runs of Example I were repeated with the difference, however, that 1.5 mhm lithium aluminum hydride and 0.75 mhm of titanium tetrachloride were used instead of the respective quantities in Example I. Instead of the diethyl ether used in Example I, in this example 6.0 mhm of methyl ether was added after the addition of the lithium aluminum hydride solution. The polymerization was carried out at a temperature of 50° C for 8 hours. The results of this example are shown in the following Table II.

TABLE II

| Run No. | MeI mhm | Con-version wt. % | Trans wt. % | Vinyl wt. % | Inherent Viscosity |
|---|---|---|---|---|---|
| 1 | 0 | trace | — | — | — |
| 2 | 2 | 16 | 54.1 | 26.6 | 1.04 |
| 3 | 4 | 14 | 67.4 | 14.2 | 1.73 |
| 4 | 6 | 40 | 78.5 | 10.0 | 2.90 |
| 5 | 8 | 15 | 75.9 | 9.6 | 1.92 |
| 6 | 12 | 6 | 71.8 | 10.8 | 1.73 |

From the results shown in Table II it can be seen that both the conversion rate and the trans content have a maximum at the same methyl iodide content.

EXAMPLE III

780 Parts by weight of cyclohexane were charged into each of four beverage bottles. Then a nitrogen purge was started to create an inert atmosphere above the reaction mixture in the bottles. Thereafter 100 parts by weight of isoprene were added to each of the bottles. To this mixture lithium aluminum hydride was added as a solution in diethyl ether or in dibutyl ether. These ethers were both solvent for the hydride and directing ether for the polymerization. The quantities and kinds of ethers, as well as the quantities of lithium aluminum hydride charged to the bottles, are shown in the following table. Thereafter methyl iodide and finally titanium tetrachloride were added. The quantities of these agents are also shown in the following table. The bottles were then capped and tumbled in a bath of 50° C for 30 hours. After the polymerization 1 phm of 2,6-di-tert-butyl-4-methylphenol was added in a 50/50 volume ratio toluene/isopropyl alcohol solution. The polymer solutions were filtered and the polymer was then coagulated by adding the filtrate to isopropyl alcohol. The polymers were then collected by filtration and dried under reduced pressure. The results are shown in the following table:

TABLE III

| Run No. | Ether, phm | LiAlH$_4$[a] mhm | MeI mhm | TiCl$_4$ mhm | Conversion Weight % |
|---|---|---|---|---|---|
| 1 | Et$_2$O 3 | 1.5 | 12 | 0.75 | 25 |
| 2 | Et$_2$O 6.1 | 3.0 | 20 | 1.5 | 5 |
| 3 | Bu$_2$O 3.3 | 1.5 | 12 | 0.75 | 35 |
| 4 | Bu$_2$O 6.6 | 3.0 | 20 | 1.5 | 40 |

[a]In Et$_2$O or Bu$_2$O as tabulated.
Et$_2$O = diethyl/ether, Bu$_2$O = di-n-butyl ether,
MEI = methyl iodide The results of this example show that in the case of ethyl ether employed, the increase of the quantity of catalyst system reduces the conversion rate, whereas in the case of the dibutyl ether employed, an increase in the quantity of catalyst system slightly increases the conversion rate. The conversion was determined by weighing the polymer as a percentage of the weight of the monomer.

EXAMPLE IV

Four bottles were charged with the ingredients used in Run 1 of Example III; however, in addition to the 3 phm of diethyl ether introduced by way of the 0.35 molar solution of lithium aluminum hydride in diethyl ether, another 5 phm diethyl ether were added. Furthermore, the charge order following the introduction of the cyclohexane diluent and the nitrogen purge was varied for the four bottles as shown in the following table. The polymerization was carried out at 70° C for 18 hours.

TABLE IV

| Run No. | Charge-Order[a] | Conversion Wt. % | Trans[b] Wt. % | Isopropenyl Wt. % | Inherent[c] viscosity | Gel[d] Wt. % |
|---|---|---|---|---|---|---|
| 1 | E,I,L,C,T | 18 | 87.8 | 1.7 | 1.22 | 0 |
| 2 | E,L,C,T,X,I | 22 | 86.2 | 1.8 | 1.77 | 0 |
| 3 | L,E,T,C,X,I | 25 | 85.1 | 1.6 | 1.36 | 0 |
| 4 | L,I,E,T,C | 23 | 83.8 | 1.7 | 1.48 | 0 |

[a]E, Et$_2$O; I, isoprene; L, LiAlH$_4$; C, MeI; T, TiCl$_4$; X, 0.5 hr.
[b]Determined by IR absorption spectroscopy.
[c]Determined in accordance with U.S. Pat. No. 3,278,508, column 20, note a, using tetrahydrofuran instead of toluene and instead of filtering through a sulfur absorption tube the sample was filtered through a fritted glass filter stick of grade C porosity and pressuring it directly into the viscosimeter.
[d]Determined in accordance with U.S. Pat. No. 3,278,508, column 20, note b, employing tetrahydrofuran instead of toluene.

This table shows that the catalyst system of this invention produces a polyisoprene with a very high content of trans configuration. In addition it can be seen from this table that the charge order of the ingredients is of no significant influence on the overall results.

EXAMPLE V

Example IV was repeated with six bottles; however, 2.5 phm of diethyl ether were employed instead of the additional 5 phm diethyl ether used in Example IV. In this example varying quantities of dimethyl ether were used in addition to the diethyl ether as shown in the following table. Furthermore, the charge order for the six runs was varied as shown in the following table.

TABLE V

| Run No. | Me$_2$O mhm | Charge Order | Conversion Wt. % | Trans Wt. % | Isopropenyl Wt. % | Inherent Viscosity | Gel Wt. % |
|---|---|---|---|---|---|---|---|
| 1 | 0 | A | 28 | 80.8 | 1.9 | 1.44 | 0 |
| 2 | 5 | A | 20 | 84.2 | 1.7 | 1.23 | 0 |
| 3 | 10 | A | 10 | — | — | — | — |
| 4 | 0 | B | 35 | 77.5 | 2.2 | 1.18 | 0 |
| 5 | 5 | B | 28 | 88.0 | 1.7 | 1.01 | 0 |
| 6 | 10 | B | 15 | — | — | — | — |

A: Charge Order: cyclohexane, nitrogen purge, lithium aluminum hydride, dimethyl ether, titanium tetrachloride, methyl iodide, 30 min. at 27° C, isoprene.
B: Charge Order: cyclohexane, nitrogen purge, isoprene, lithium aluminum hydride, dimethyl ether, titanium tetrachloride, methyl iodide.

The runs show that an addition of a small quantity of dimethyl ether increases the content of trans configurations in the polymer. The isopropenyl content is reduced at the same time.

Furthermore it has been found that an addition or increase of the lower alkyl ether content in the reaction mixture reduces the crystallization time of the polymer. The crystallization time of the polymer is the time which passes after the removal of the polymer from the drying oven which is operated at 50° to 60° C until definite onset of crystallization. Upon crystallization the sample turns from clear to opaque. It has, however, also been found that an excessive amount of ether reduces the conversion rate and finally suppresses the conversion completely. It was also found that no polymerization took place when lithium aluminum hydride was employed as a 0.2 molar solution in N-methylmorpholine.

Reasonable variations and modifications, which will be apparent to those skilled in the art, can be made in this invention without departing from the spirit and scope thereof.

What is claimed is:

1. A process for the production of a non-resilient polyisoprene with a high content of trans-configuration, which comprises polymerizing isoprene under polymerization conditions in the presence of a polymerization catalyst obtained by admixing
   a. a metal hydride selected from the group consisting of LiAlH$_4$, NaBH$_4$, and LiBH$_4$,
   b. a titanium tetrahalide compound selected from the group consisting of TiCl$_4$ and TiBr$_4$ in a mole ratio of 1/1 to 6/1 of metal hydride/titanium tetrachloride,
   c. methyl iodide in a mole ratio of 1/0.5 to 1/50 of metal hydride/methyl iodide, and
   d. an ether selected from the group consisting of diethyl ether and di-n-butyl ether, under the further provision that the polymerization is carried out with a metal hydride concentration of 0.5 to 20 mhm and an ether concentration of 1 to 30 phm.

2. A process in accordance with claim 1 wherein said catalyst has additionally admixed therewith an ether selected from the group consisting of dimethyl ether, methyl ethyl ether and mixtures thereof.

3. A process in accordance with claim 1 wherein said metal hydride is lithium aluminum hydride.

4. A process in accordance with claim 1 wherein said ether is a mixture of diethyl ether and dimethyl ether.

5. A process in accordance with claim 1 wherein said titanium tetrahalide is titanium tetrachloride.

6. A catalyst system obtained by admixing a. a metal hydride selected from the group consisting of LiAlH$_4$, NaBH$_4$, and LiBH$_4$,
b. a titanium tetrahalide compound selected from the group consisting of TiCl$_4$ and TiBr$_4$ in a mole ratio of 1/1 to 6/1 of metal hydride/titanium tetrahalide compound,
c. methyliodide in a mole ratio of 1/0.5 to 1/50 of metal hydride/methyliodide, and
d. an ether selected from the group consisting of diethyl ether and di-n-butyl ether with the further provision that 1 to 30 g of ether are present per 0.5 to 20 gram millimoles of metal hydride.

7. A catalyst system in accordance with claim 6 wherein said catalyst has additionally admixed therewith an ether selected from the group consisting of dimethyl ether, methylethyl ether and mixtures thereof.

8. A catalyst system in accordance with claim 6 wherein said metal hydride compound is lithium aluminum hydride.

9. A catalyst system in accordance with claim 6 wherein said ether is a mixture of diethyl ether and dimethyl ether.

10. A catalyst system in accordance with claim 6 wherein said titanium tetrahalide compound is titanium tetrachloride.

11. A catalyst system in accordance with claim 6 wherein said ether is di-n-butyl ether.

* * * * *